US009446950B2

United States Patent
Chaikin et al.

(10) Patent No.: US 9,446,950 B2
(45) Date of Patent: Sep. 20, 2016

(54) METHOD AND SYSTEM USING MICROSCOPIC BUILDING BLOCKS FOR DRIVING 3D SELF-ASSEMBLY

(76) Inventors: Paul Michael Chaikin, Pennington, NJ (US); Tycho Sleator, New York, NY (US); Remi Dreyfus, New York, NY (US); Daniel Sleator, Pittsburgh, PA (US)

( * ) Notice: Subject to any disclaimer, the term of this patent is extended or adjusted under 35 U.S.C. 154(b) by 692 days.

(21) Appl. No.: 13/574,068

(22) PCT Filed: Jan. 28, 2011

(86) PCT No.: PCT/US2011/023063
§ 371 (c)(1),
(2), (4) Date: Nov. 5, 2012

(87) PCT Pub. No.: WO2011/094643
PCT Pub. Date: Aug. 4, 2011

(65) Prior Publication Data
US 2013/0042457 A1 Feb. 21, 2013

Related U.S. Application Data

(60) Provisional application No. 61/299,636, filed on Jan. 29, 2010.

(51) Int. Cl.
*H01S 4/00* (2006.01)
*B82B 3/00* (2006.01)

(52) U.S. Cl.
CPC ........ *B82B 3/0052* (2013.01); *Y10T 29/49826* (2015.01); *Y10T 403/74* (2015.01)

(58) Field of Classification Search
CPC ........... B82B 3/0052; Y10T 29/49826; Y10T 403/74; B81C 1/00007; H01L 24/83; H01L 24/82; H01L 24/89
USPC .................................................... 29/92.1, 821
See application file for complete search history.

(56) References Cited

U.S. PATENT DOCUMENTS

| | | | |
|---|---|---|---|
| 5,355,577 A * | 10/1994 | Cohn | ........................... 29/592.1 |
| 6,507,989 B1 | 1/2003 | Bowden et al. | |
| 6,864,570 B2 * | 3/2005 | Smith | ........................... 257/703 |
| 2008/0218299 A1 | 9/2008 | Arnold | |

OTHER PUBLICATIONS

PCT International Search Report and Written Opinion on PCT Application No. PCT/US2011/023063, dated Oct. 25, 2011, (10 pgs.)
Tricia et al., "Design and Self-Assembly of Open. Regular 3D Mesostructures." Science, May 1999, vol. 285, pp. 948-951.

(Continued)

*Primary Examiner* — David Bryant
*Assistant Examiner* — Jun Yoo
(74) *Attorney, Agent, or Firm* — Foley & Lardner LLP

(57) ABSTRACT

A method and system for constructing structures by self-assembly of objects. The method and system include providing a first object having a first selected shape and providing a second object having a second selected shape, the shape of the first and second objects interacting to form an alignment which has only a simple stable state arising from minimization of interaction energy for the single stable state.

9 Claims, 15 Drawing Sheets

(56) References Cited

OTHER PUBLICATIONS

Zheng et al., "Fabrication of Multicompnent Microsystems by directed Three-Dimensional Self-Assembly." Advanced Functional Materials,(2005), vol. 15, No. 5.

Liang et al., Towards Optimal Designs for Self-Alignment in Surface Tension Driven Micro-Assembly, IEEE Micro Electro Mechanical Systems, 2004 17th IEEE International Conference on (MEMS), 2004, 4 pages.

* cited by examiner

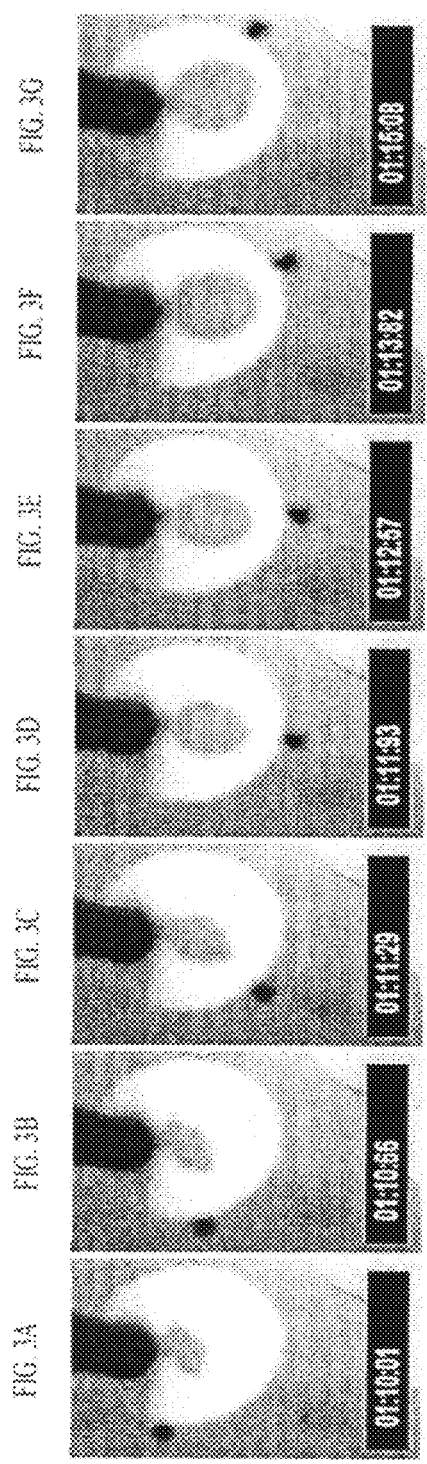

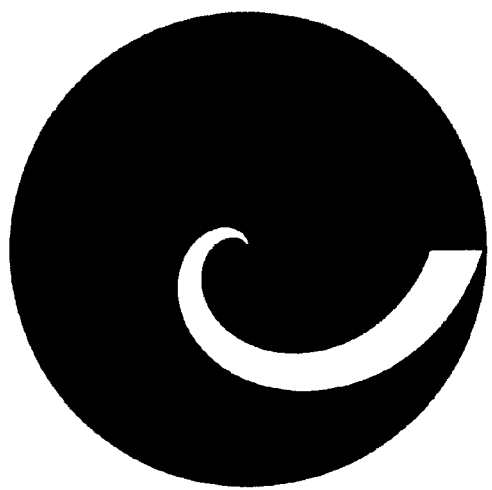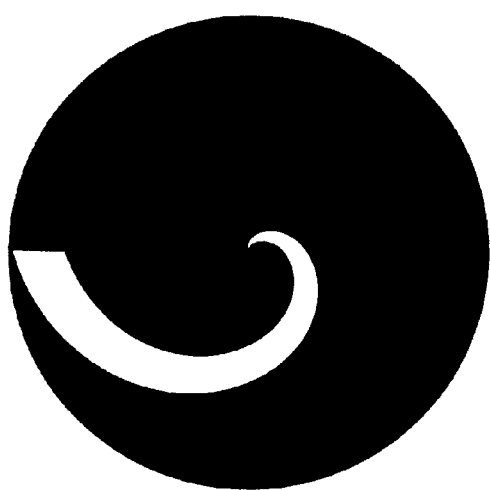
FIG. 5

METHOD AND SYSTEM USING MICROSCOPIC BUILDING BLOCKS FOR DRIVING 3D SELF-ASSEMBLY

CROSS-REFERENCE TO RELATED PATENT APPLICATION

The present application is a U.S. national stage application claiming the benefit of International Application No. PCT/US2011/023063, filed on Jan. 28, 2011, which claims priority from U.S. Provisional Application No. 61/299,636, filed Jan. 29, 2010, the entire contents of which are incorporated herein by reference in their entirety.

FIELD OF THE INVENTION

The present invention is directed to a method and system for self-assembly construction of a structure. More particularly, the invention is directed to providing a first object with a first shape and a second object with a second shape with symmetry such that the first and second objects interact to align in a stable state arising from minimization of interaction energy.

BACKGROUND OF THE INVENTION

Creating 3D structures by self assembly with specific architecture remains a scientific and technological goal far from being achieved. Inducing the spontaneous association of microscopic building blocks into macroscopic structures has been a promising way to create these new materials for a variety of useful applications. Such fabrication processes typically require interactions between microscopic building blocks. Many kinds of interactions have been investigated so far; including, for example, electrostatic, magnetic, Van der Waals, depletion, and DNA interactions. For many of these interactions, especially Van der Walls, depletion, and DNA interactions, the attractive energy between the particles is proportional to the overlapping surface between the colloids. Controlling the relative positions and orientations of the microscopic building blocks is a critical issue in such processes. However, to date there has been no efficient or reliable process that enables such spontaneous assembly and orientation of building blocks.

SUMMARY OF THE INVENTION

A method and system are provided herein to create a particular building block shape, hereinafter "universal alignment patches". Universal alignment patches that have the ability to align in only a single configuration when they interact face to face. The "universal alignment patches" can be attached to any structures, forcing two such structures to join in a particular configuration. The shape of the patches must be such that the aligned configuration corresponds to the only existing minimum in the energy landscape. Thus, the shape has to be carefully chosen such that the energy landscape does not exhibit any metastable configurations. For example, in one nonlimiting embodiment a flat eccentroid shape has a hole therethrough or a recessed region, which provides a desired shape meeting the stability requirements. In other embodiments, the two or more objects can have different shapes so long as the objects interact to form only one stable aligned state with the energy overlap minimized by the maximization of their face-to-face contact area. Such a method and system therefore enables exploitation for a variety of useful applications, particularly at the colloidal, ~1 µm, scale. For example, methods and systems can be used in conjunction with biotechnology in related application U.S. Ser. No. 12/482,823 which is incorporated in its entirety by reference herein.

BRIEF DESCRIPTION OF THE DRAWINGS

FIGS. 3A-3G shows a time lapse set of freeze frames at different times for interactions of the eccentric hole shaped objects.

FIG. 5 shows two disk patterns with a spiral cut out or indentation, designed so that particles rotate primarily in one direction as they align.

DETAILED DESCRIPTION OF PREFERRED EMBODIMENTS

Figure 1A:
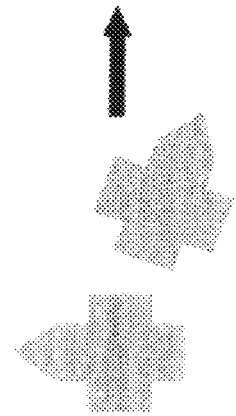
FIG. 1A shows two objects positioned apart.
Figure 1B:
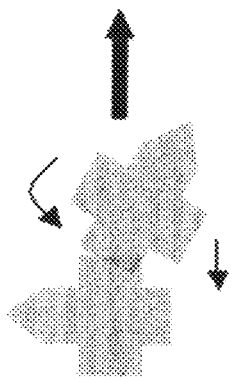
FIG. 1B shows the two such objects interacting to align.
Figure 1C:
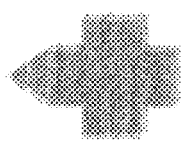
FIG. 1C shows a first interaction and overlap configuration of the two objects.
Figure 1D:
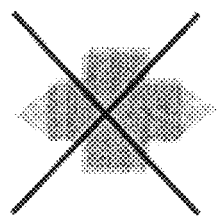
FIG. 1D shows a second configuration which is a metastable state of overlap of the two objects; this is therefore a system that does not meet the desired criteria.

For alignment of particles, in fact alignment of any particles or structures that are desirable to self-assemble, a shape with unique physical and mathematical properties has been identified for accomplishing this desired goal. An interaction between universal alignment patches, such as flat patterned surfaces, can be established which depends principally on the overlap area of two patterns. Examples of useful attractions are surface tension, Van der Waals forces, depletion forces or the forces between DNA covered surfaces. Self-assembly into a desired geometry can then be achieved using a shape which forces the surfaces to come together in only one configuration with no unwanted trapped metastable orientations. This is the same as achieving a landscape with only one energy interaction minimum. The patterns can be designed on any object and produced as "patches" which can be affixed to any object. For example, in one embodiment a circular patch having a hole therethrough or and indented region provides such a shape. A schematic example to illustrate the problems of self-assembly is shown in FIGS. 1A and 1B with two objects of the same complex shape interacting in a sequence. FIGS. 1C and 1D show a stable configuration and a metastable configuration, respectively. When the two objects (universal alignment patches) overlap, they interact and orientate in order to maximize the overlapping surface and therefore minimizing the interaction energy. The shape chosen in FIG. 1 is, however, not a good one as that configuration has an obvious metastable position (FIG. 1D) in which the two objects may be trapped. This shape is therefore a typical example of an undesirable shape.

There are, however, various shapes which meet the criterion of having only one stable alignment state (with no metastable states). The overall shape can be the assembly of two or more discontinuous shapes, and while the most preferred embodiment has shapes that are the same, in other embodiments shapes can be different as long as they meet the requirement that they interact to align in only one stable state. In one example embodiment, the sets of different shapes in FIGS. 2A-2D and 2G illustrate various shapes which meet the requirements of the invention. The simple shapes are circular disks with various illustrated holes, including truncated holes, inside; and the hole must be off centered. The hole radius cannot exceed a certain critical ratio of the outer circle diameter. These shapes have only one stable point in their energy landscape which is obtained when the outer circumference of the disks are aligned and the inner holes are aligned.

Figure 2A:
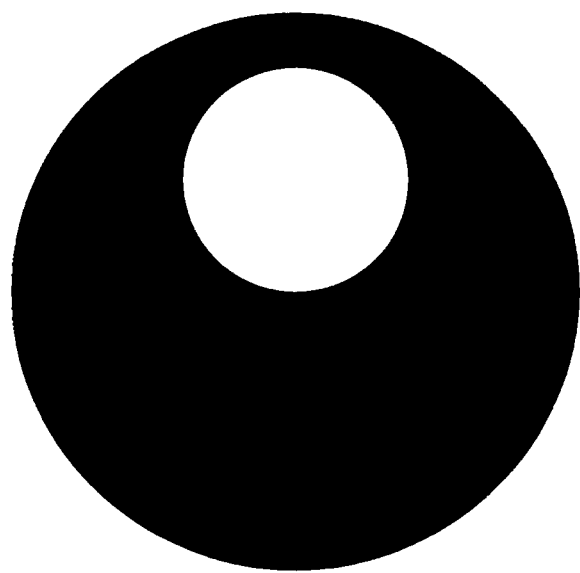
FIG. 2A shows a top view of two overlapping objects, each being circular with an off-center hole therethrough or surface recess on each object.
Figure 2B:
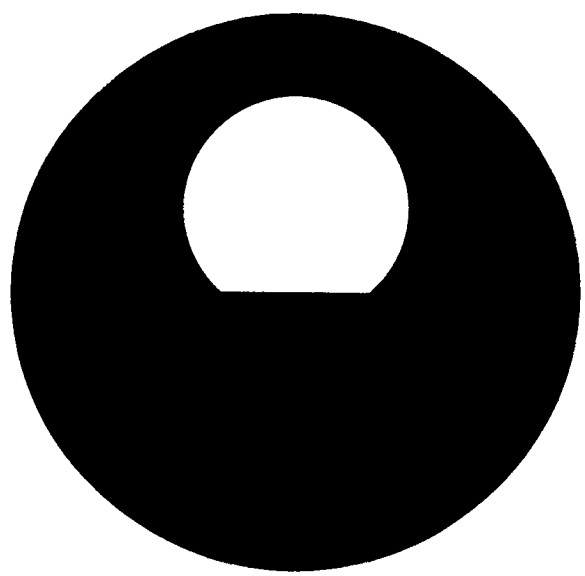
FIG. 2B shows another type of shape embodiment similar to FIG. 2A.
Figure 2C:
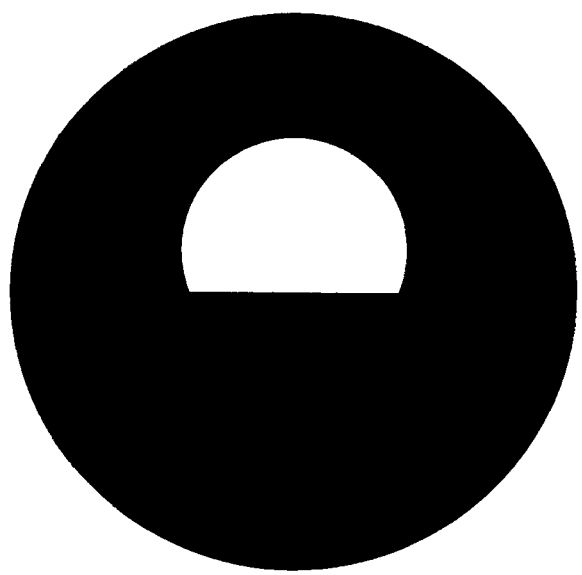
FIG. 2C shows yet another embodiment of shape.
Figure 2D:
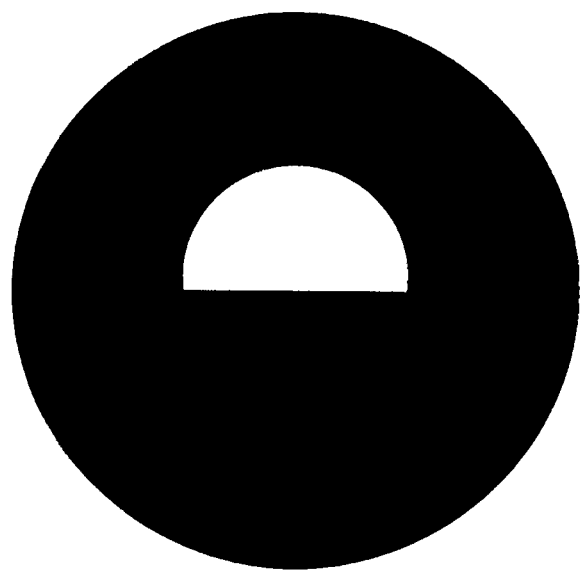
FIG. 2D shows still another embodiment of the invention.
Figure 2E:
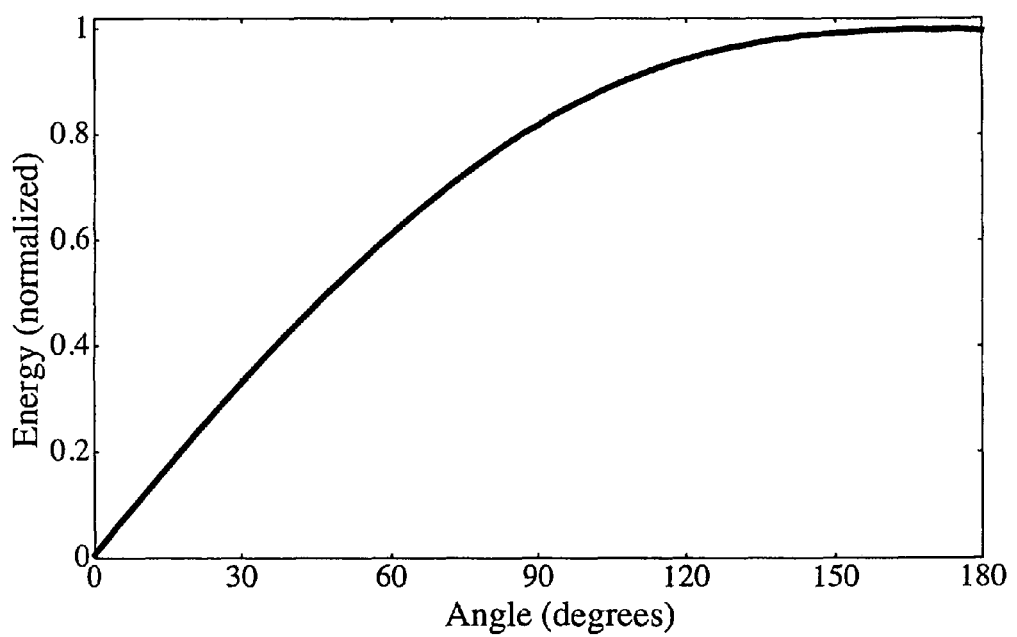
FIG. 2E shows the energy landscape for the embodiment of FIG. 2A
Figure 2F:
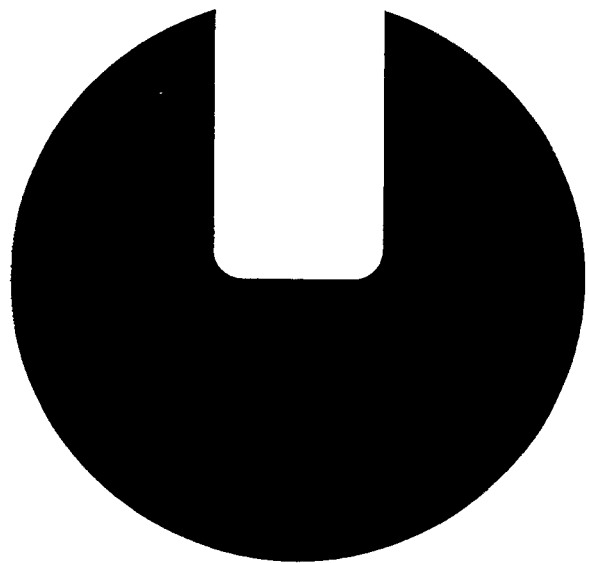
FIG. 2F shows yet another embodiment with a groove therein.

Considering the shape of FIG. 2A which shows a disk with an off-centered hole in it, one can readily show by conventional, well-known methods that two identical particles having such shapes translate and rotate to find a single minimum of energy when they interact. In this case, both objects will translate and rotate until their energy is minimized. FIG. 2E illustrates the normalized minimum energy as a function of angular displacement from perfect alignment. It should be appreciated that one of ordinary skill can calculate energy states of objects typically based upon a conventional numerical calculation approach.

These methods and systems for achieving an object shape which meets the above requirements should therefore be valid for any kind of interactions at any scale as long as the attraction is proportional to the overlapping area. Macroscopic measurements were performed to confirm the validity of these calculations. Actual disks with eccentric holes were constructed of plastic, and were about 1 cm in radius. Silicon oil was applied to the disks; therefore, capillary forces which are also proportional to the overlapping area should drive their alignment. For these examples, the shapes are attached to a cylinder, which is held on a vibrating table. The vibrating table is used in order to overcome any solid friction effects between the disks. FIGS. 3A-3G show the sequential, freeze frame motions of two such disks. One disk is attached, the other disk is held to the first disk above by capillarity. When the vibrating table is turned on, both shapes stay aligned and come back to their alignment position when they are moved to a position where they are not perfectly aligned. Without the holes the disks have been observed to undergo random motion.

Figure 4A:
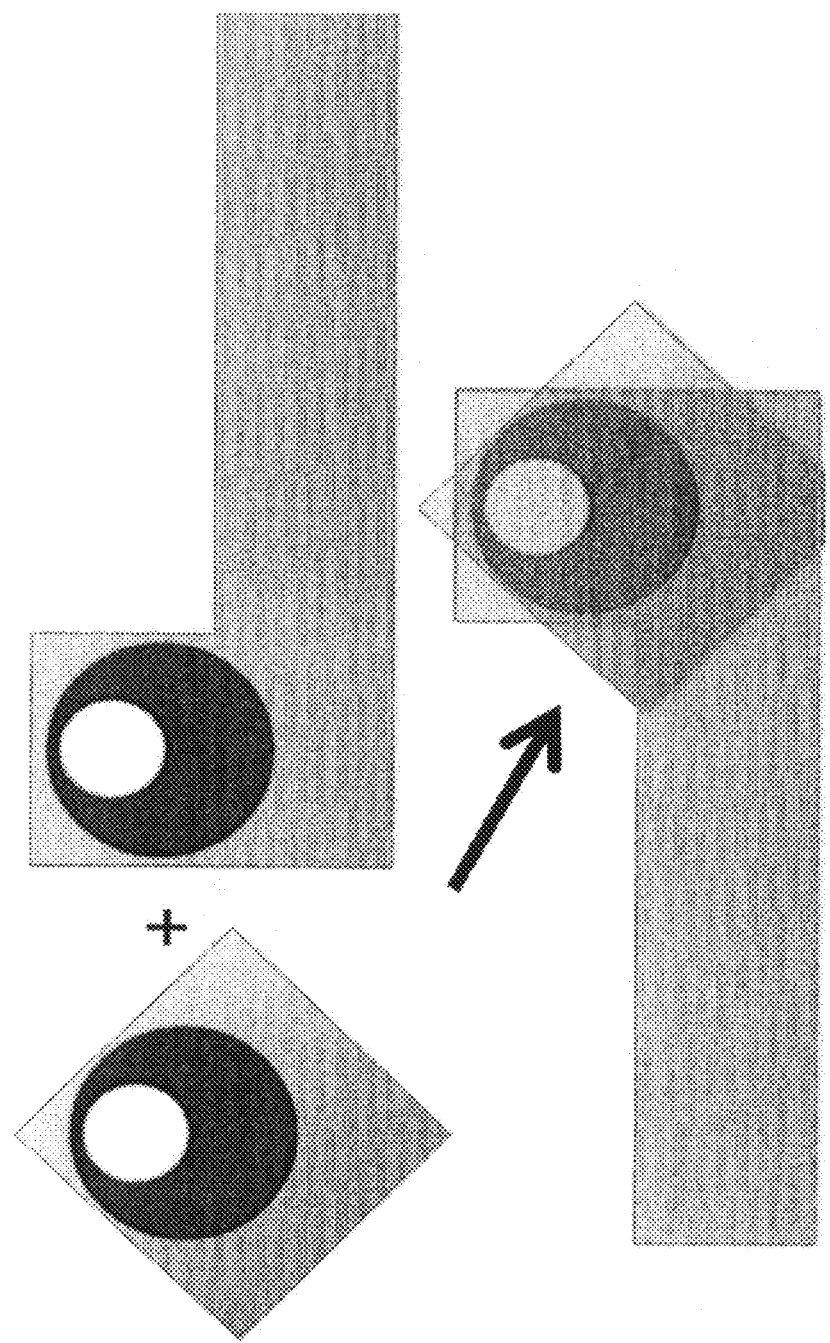
FIG. 4A shows placement of one alignment patch on the face of an "L" shaped object and another at an angle on a cube (or a square cross section) with interaction causing the cube (or a square cross section) and "L" to come together.
Figure 4B:
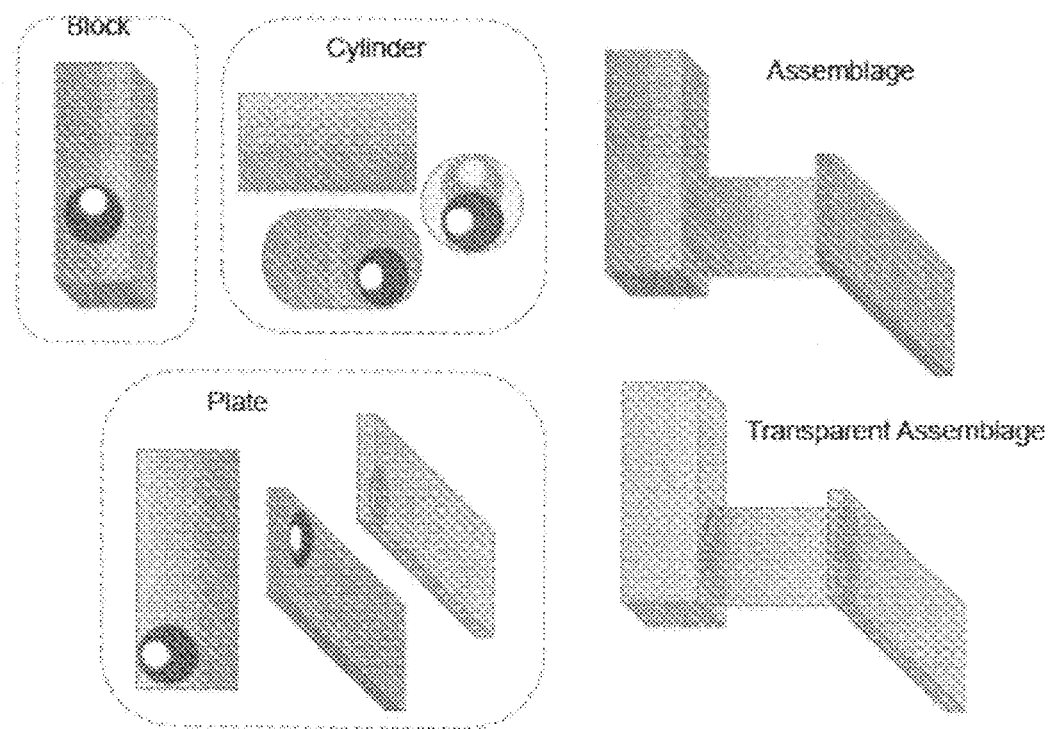
FIG. 4B shows the alignment of three objects, a block having an alignment patch, a cylinder having an alignment patch on each end face, and a plate having an alignment patch, which all assemble to form an assemblage through interaction of universal alignment patches.

The methods and systems described herein can be used for a variety of commercial purposes. For example, as shown in FIG. 4A, if you place one object on a face of an "L" shaped object and another at an angle on a cube(or a square shape), then the cube (or a square shape) and "L" will come together at the set orientation. Such a universal alignment patch can be used to create arbitrary shapes from building blocks using any of the various herein described surface attractive interaction methodologies. In one embodiment, more than one universal alignment patch can be placed on a shaped object, allowing for selective orientation of the shaped object, for example, as seen in FIG. 4B. FIG. 4B shows the alignment of three objects, a block having an alignment patch, a cylinder having an alignment patch on each end face, and a plate having an alignment patch, which all assemble to form an assemblage through interaction of universal alignment patches. Further, in another embodiment, three-dimensional structures may be assembled via interaction among multiple building blocks connected via the described universal alignment patches. It should be appreciated that a plurality of different universal alignment patches may be used so as to provide for unique combinations of the building blocks to achieve a desired structure. As a nonlimiting example, at least a third object and a fourth object are present wherein the first object is attached to the third object via interaction of the described universal alignment patches and the second object is attached to a fourth object via the described universal alignment patches so as to achieve a selectable orientation of the third object relative to the fourth object when the first object and the second object form and align. In one embodiment, the universal alignment patches have a three dimensional shape, such as, but not limited to a dome or cone, as a protrusion or recess where the face of the alignment patch has rotational symmetry to allow alignment as described herein. Further, additional features may be included on the universal alignment patches to encourage or strength the interaction or selectiveness of interaction of the patches, such as but not limited to the use of DNA or chemical functional groups.

Figure 6:
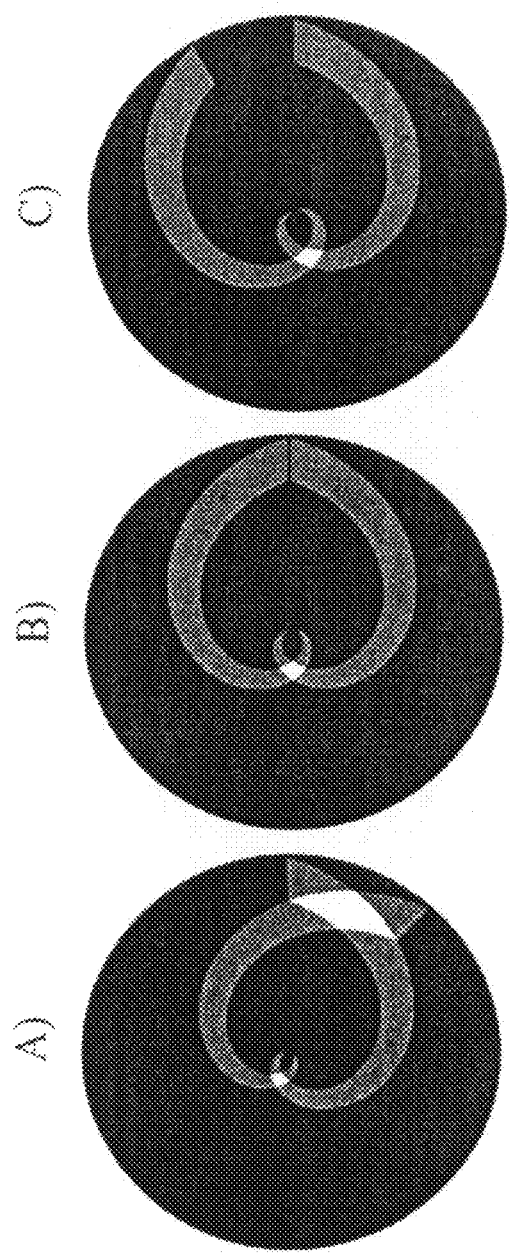
FIGS. 6A-6C shows two disks with spiral patterns, aligned face to face showing overlaps as they rotate.

In yet another form of the invention, the shapes that overlap each other can also be of a different type of shape. For example, FIGS. 6A and 6B, show two shapes that differ from each other in that one of the shapes is a mirror image of the other. The two shapes in this figure are disks with a "hole" (white area) in the shape of a widening spiral from the middle to the edge of the disk. For the purposes of future reference the disk of FIG. 5A is considered to have a counter-clockwise spiral, and the disk of FIG. 5B is considered to have a clockwise spiral. When one of the disks is placed on top of the other, there is never perfect overlap of the two disks, since they are different shapes. Nevertheless, the area of overlap is a function of the relative position and orientation of the two disks, so that under the conditions described hereinbefore for energy minimization, these disks will translate and rotate relative to each other so as to reach a configuration where the overlap between the two disks is a maximum to minimize overlap energy.

FIGS. 6A-6C show various relative orientations of the two disks from FIGS. 5A and 5B, when the disk of FIG. 5B is placed on top of the disk of FIG. 5A. In these FIGS. 6A-6C, the regions shown in black are where there is overlap between areas on each of the two disks. Regions shown in light gray are where part of the hole on one disk overlaps a region on the other disk that is not part of a hole, and the white areas correspond to regions where the holes in the two disks overlap. The configuration of maximum overlap, or lowest energy, is that configuration noted by inspection of FIGS. 6A-6C where the area of the black region is a maximum and thus corresponds to FIG. 6A.

Figure 7:
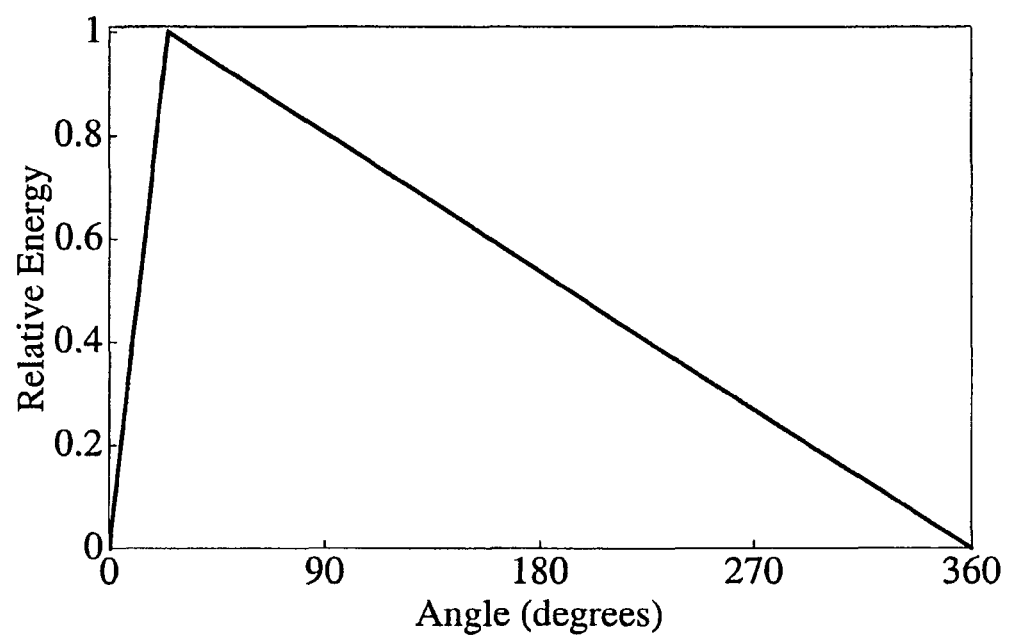
FIG. 7 shows energy as a function of angle for the spiral shaped patterns in FIGS. 6A-6C.

FIG. 6B shows the situation where the disk with clockwise spiral is rotated so that the overlap area between the disks is smaller (smaller area of black region). This is the smallest overlap area possible under conditions that the outer edges of the two disks overlap. Thus, FIG. 6B represents the configuration with highest energy under this condition. When the disk with clockwise spiral is rotated further (see FIG. 6C), this has slightly lower energy then the configuration of 6B. Thus, there is a torque tending to rotate the disk with clockwise spiral in a counter-clockwise direction. This disk will rotate all the way around until the configuration of FIG. 6A is reached. FIG. 7 shows a sketch of the expected energy curve from the shapes shown in FIGS. 6A-6C. Zero degrees in this figure corresponds to the configuration of FIG. 6A, and increasing angle corresponds to counter-clockwise rotation of the shape with the clockwise spiral while the other shape is held fixed. The significance of this curve is that the shape of the potential is not symmetric, when the direction of rotation is reversed (Angle $\Theta \rightarrow -\Theta$). In cases where the two shapes are the same, the potential will always be symmetric.

The following non-limiting Example illustrates several aspects of invention.

EXAMPLE

Figure 8A:
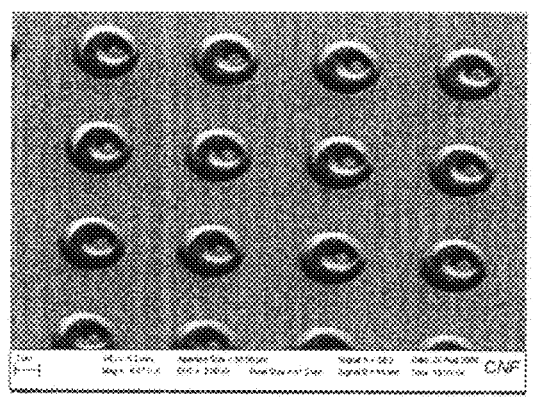
FIG. 8A shows an electron micrograph of a set of colloidal particles fabricated with the eccentric hole motif and FIG. 8B shows an enlarged electron micrograph image of two overlapping particles of the shape of FIG. 8A.
Figure 8B:
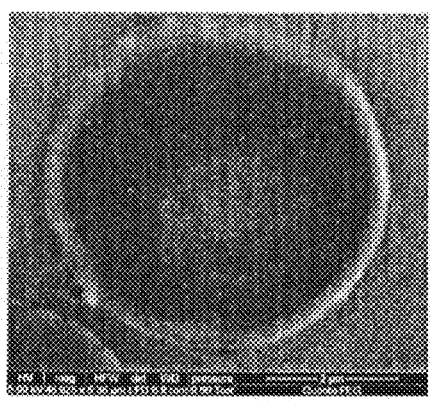

To test the feasibility of these ideas on a several micron scale colloidal disks with eccentric holes were fabricated at the Cornell Center for Nanofabrication (CNF). Electron micrographs of the 5 micron disks with 2 micron holes is shown in FIG. 8A. Note that both disks and holes are circular although the image is distorted. The disks were separated from the substrate and dispersed in water with surfactant. An electron micrograph of two overlapping disks as in FIG. 8A, which have their holes aligned is shown in FIG. 8B.

Figure 9:
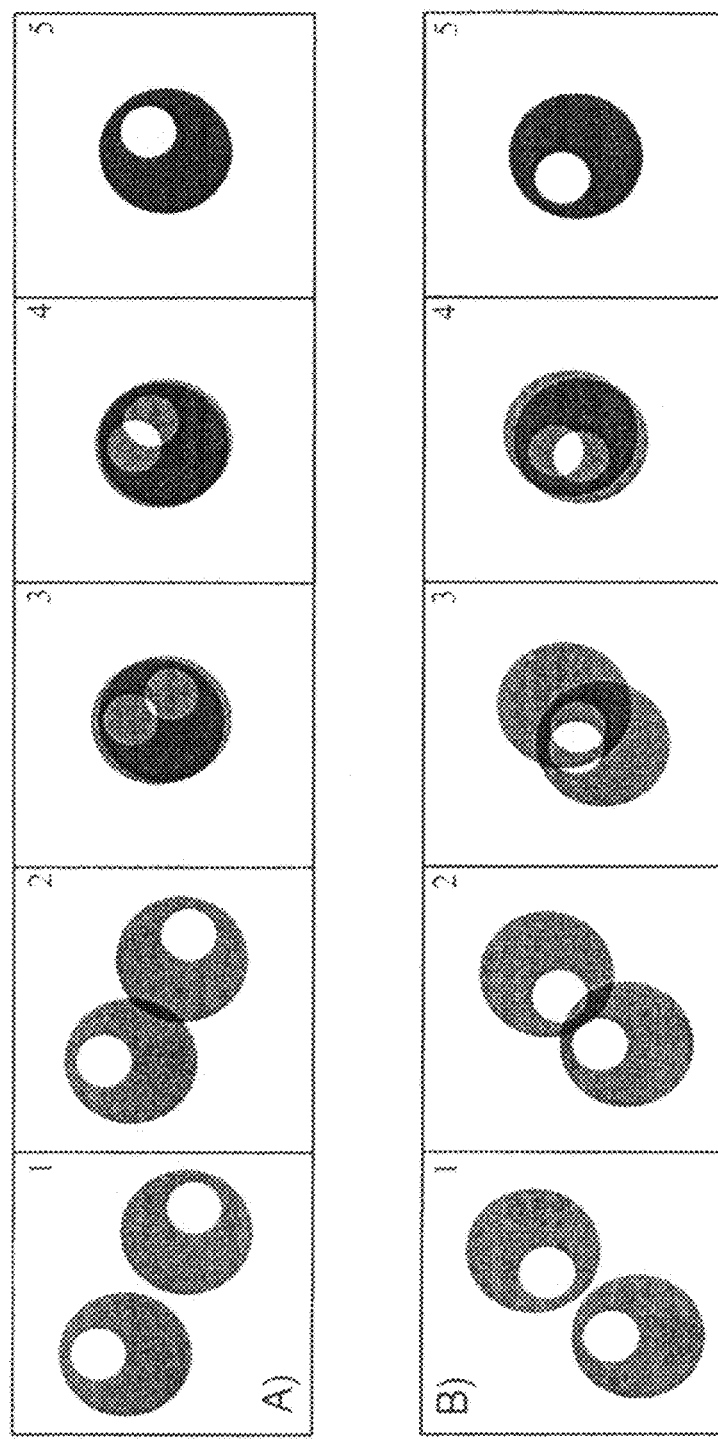
FIGS. 9A and 9B show two schematic time lapse sequences of the centering and alignment of disks with off-center holes. The interaction between the disks is proportional to their overlap area. Independent of the initial configuration as the disks first touch, they are drawn together and rotate until their centers are coincident and their holes are completely overlapped.

In FIGS. 9A and B illustrates how two disks with off-centered holes will be drawn together and aligned in a unique configuration. Independent of the point and configuration of initial overlap the area monotonically increases with relative displacement and rotation until maximum overlap occurs. The maximum overlap corresponds to the disks being centered on one another and the holes being completely aligned.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A method of constructing structures by self-assembly comprising the steps of:
   providing a first object having a first selected shape and a first object hole or a first object recessed region;
   providing at least a second object having a second selected shape different from the first shape and a second object hole or a second object recessed region, the objects having a symmetry; and
   interacting the first object and the at least second object; and
   forming an overlapping alignment which has only a single stable state arising from minimization of interaction energy for the single stable state.

2. The method as defined in claim 1 wherein the interaction energy is selected from the group of electrostatic, magnetic, Van der Waals, depletion and DNA interaction.

3. The method as defined in claim 1 wherein the first object is attached to a first component and the second object is attached to a second component, thereby allowing the first component to interact with the second component to form an assemblage.

4. The method as defined in claim 3 wherein the first component comprises a first geometry and the second component comprises a second object matable with the first object to form a product.

5. The method as defined in claim 1 wherein the interaction energy is inversely proportional to area of overlap of the first object and the second object.

6. The method as defined in claim 1 wherein the different shape consists of a first disk with a first hole and a second disk with a second hole which is a mirror image of the first hole.

7. The method of claim 1 wherein the provided first object is an eccetroid.

8. The method of claim 1 wherein at least one of the first hole or recessed region and the second hole or recessed region are eccentric.

9. A method of constructing structures by self-assembly comprising the steps of:
   providing a first object having a first selected shape and a first eccentric object hole or first eccentric object recessed region; and
   providing at least a second object having a second selected shape different from the first selected shape and a second eccentric object hole or second eccentric object recessed region, the objects having a symmetry;
   interacting the first object and the at least second object; and
   forming an alignment which has only a single stable state arising from minimization of interaction energy for the single stable state.

* * * * *